United States Patent [19]

Pontefract

[11] 4,372,652

[45] Feb. 8, 1983

[54] LAMINATED GAGE GLASS ASSEMBLY

[75] Inventor: Robert A. Pontefract, Chelmsford, Mass.

[73] Assignee: White Consolidated Industries, Inc., Cleveland, Ohio

[21] Appl. No.: 212,323

[22] Filed: Dec. 2, 1980

Related U.S. Application Data

[63] Continuation-in-part of Ser. No. 53,102, Jun. 28, 1979, abandoned.

[51] Int. Cl.$^3$ .................. G02B 5/00; G01F 23/02; G02B 7/00
[52] U.S. Cl. .................................. 350/319; 350/589; 73/328
[58] Field of Search .............. 350/319, 67; 73/323, 73/326, 328, 329, 330, 331, 334; 220/82 A

[56] References Cited

U.S. PATENT DOCUMENTS

| | | | |
|---|---|---|---|
| 3,148,543 | 9/1964 | Le Roy | 73/331 |
| 3,307,400 | 3/1967 | Le Roy | 350/319 |
| 3,380,303 | 4/1968 | Le Roy | 350/319 |
| 3,438,540 | 4/1969 | Le Roy | 350/319 |
| 3,782,809 | 1/1974 | Shropshire | 350/319 |
| 3,922,999 | 12/1975 | Meginnis | 350/319 |
| 3,942,881 | 3/1976 | Meginnis | 350/319 |
| 3,951,301 | 4/1976 | Meginnis | 350/319 |
| 4,014,214 | 3/1977 | Pontefract | 73/330 |
| 4,182,179 | 1/1980 | Meginnis | 73/330 |

*Primary Examiner*—Jon W. Henry
*Attorney, Agent, or Firm*—Pearne, Gordon, Sessions, McCoy & Granger

[57] ABSTRACT

A gage glass assembly can be mounted in a standard pipe joint flange and has a sleeve with an inturned flange at the outer end and an outwardly extending flange at the inner end. A pair of cylindrical lenses inside the sleeve are interspaced by a plastic sheet that also extends axially between the inner lens and the sleeve and outwardly over the outwardly extending flange. Both lenses and the sheet are bonded together and to the sleeve by a transparent, plastic material. A liquid level gage has a cover extending over a body having an elongated central chamber and the cover has a similarly elongated recess facing the chamber. A pair of glass lenses are stacked in the recess and a transparent plastic sheet extends between the lenses, along the side of the inner lens and outwardly over the inner side of the cover, where it serves as a gasket between the cover and the body. A plastic bonding material fills the space between the plastic sheet, the two lenses, and the cover recess.

21 Claims, 7 Drawing Figures

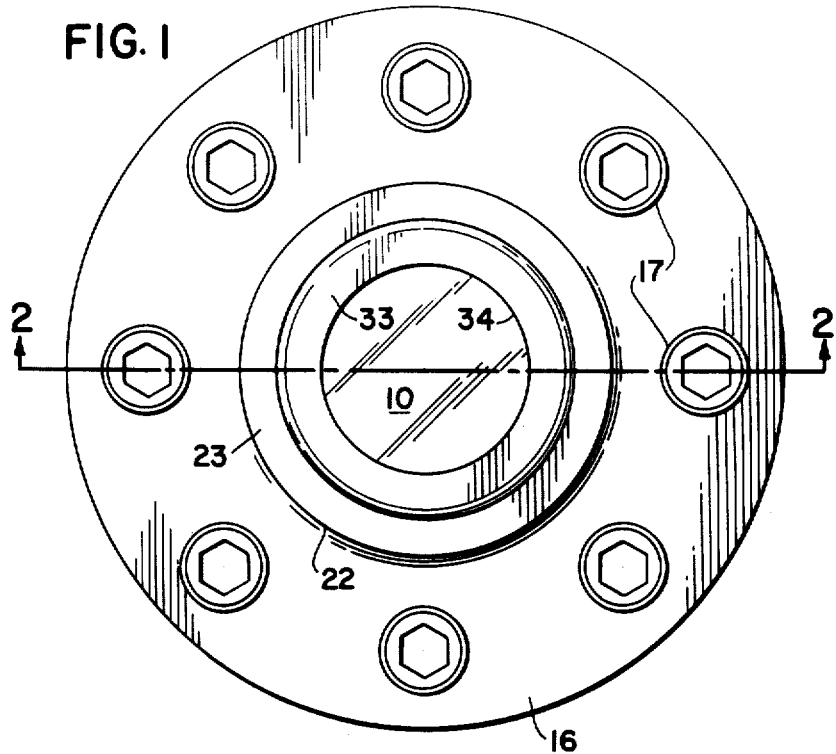
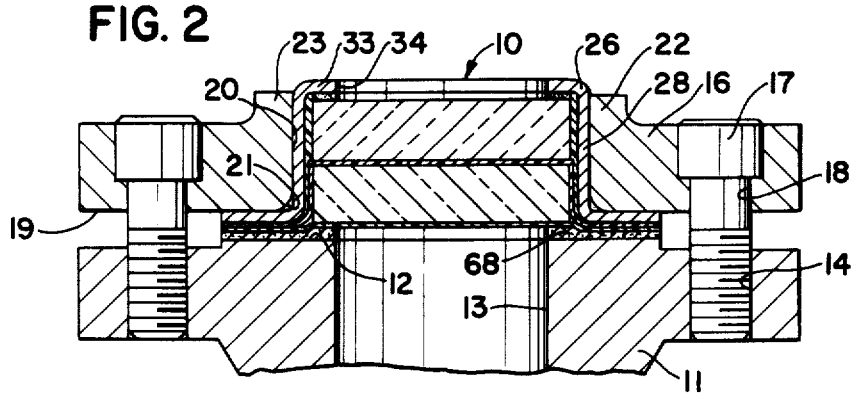

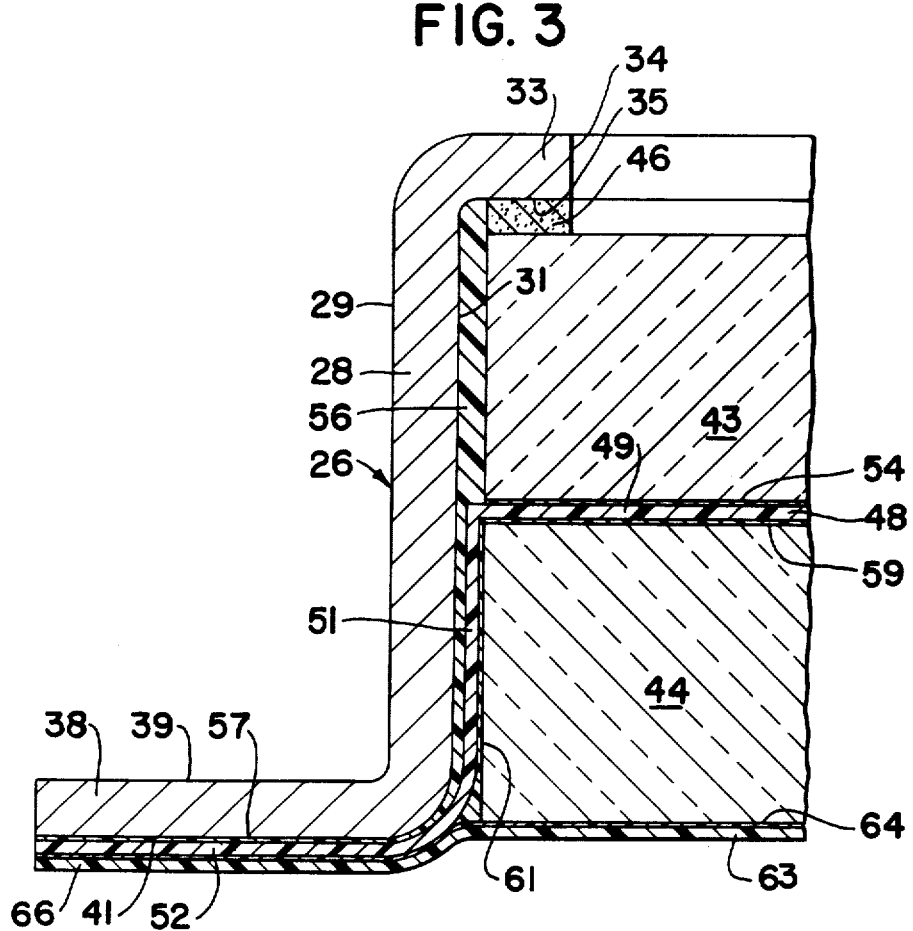

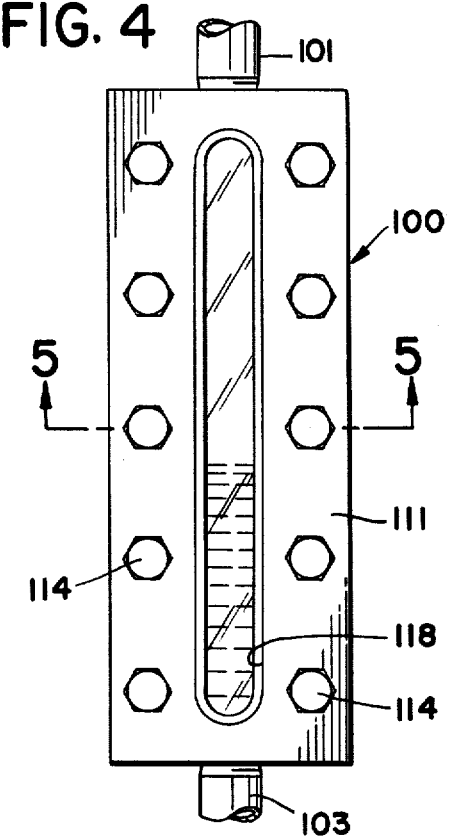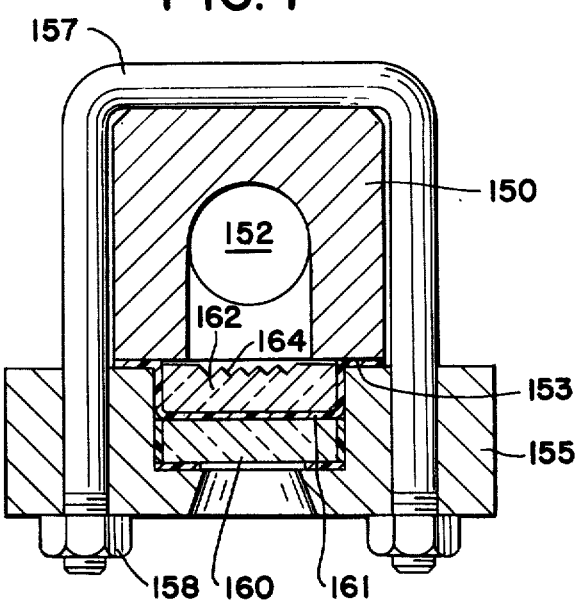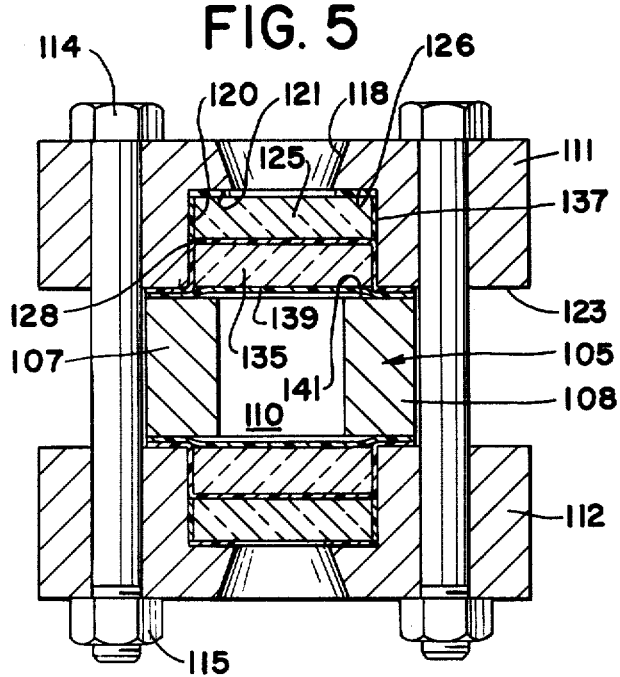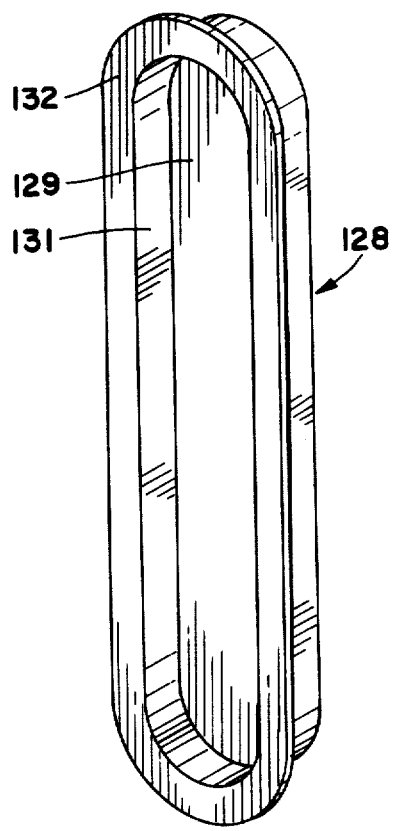

LAMINATED GAGE GLASS ASSEMBLY

This application is a continuation-in-part of the copending application of the same inventor, Ser. No. 53,102, filed June 28, 1979 now abandoned.

BACKGROUND OF THE INVENTION

This invention relates to gage glasses used in liquid level gages and sight glasses which are used to view the interior of pressure vessels, and more particularly to gage glasses that are adapted to resist corrosion and erosion by the contents of the gage or vessel, to withstand variations in temperature and pressure and to resist leakage even with the glass may become cracked or broken.

Gage glasses are used in liquid level gages and sight glasses to allow visual observation of liquids in a container or pressure vessel. Liquid level gages comprise a vertically elongated chamber in fluid communication at both the top and bottom with a liquid chamber such as a boiler, process tank, or storage tank. The provision of one or more gage glasses along a wall of the chamber allows a visual observation of the liquid level in the chamber. If a pair of glasses are arranged on opposite sides of the gage chamber, the level can be observed by transmitted light, while a glass in a single wall may require a prism surface adjacent the liquid to allow observation by reflected light. In both cases, the exposure of the surface of the glass to the liquid may allow corrosion or erosion of the glass surface to a point where the unit is no longer functional unless the gage glass is replaced, and such replacement usually involves disassembly of the unit.

Sight glasses use a single gage glass and have long been used to allow visual examination of the interior of certain vessels or containers under a wide range of conditions. A sight glass must employ a gage glass which is large enough, depending upon the application, to allow adequate visual inspection of the interior of the container and must be made resistant to the physical and chemical forces that tend to damage the sight glass. For example, the glass may be exposed to various temperatures and pressures which apply high stresses to the glass, and it may be subject to chemical corrosion depending upon the contents of the vessel. The result of these forces acting on the glass tends to make it subject to breakage and subsequent leakage of the contents, and also chemical attacks may make the glass become opaque so that it must be replaced with a clear glass to allow proper visual inspection. Thus, the sight glass must be mounted to provide adequate sealing against leakage, and must also be mounted in such a way that it can easily and quickly be replaced if it becomes damaged.

While in the beginning single prisms of glass, usually circular in shape and having parallel front and rear sides, were used, it has been discovered that the use of two or more separate glass lenses in a suitable mounting provides better resistance to breakage. It has also been discovered that when the glass lenses are subjected to compressive forces, their strength is greatly increased and it is possible to have one of the lenses crack without resulting in any leakage. Furthermore, in order that replacement may be done quickly and easily with a minimum of downtime, the glass has been mounted as a subassembly on a flange with a suitable cover so that the placement can be done simply by unbolting the cover, inserting a replacement subassembly, and then refastening the cover in place on the flange.

Other improvements made in such sight glasses include the bonding together of the separate glass lenses by plastic laminating material, the use of a plastic laminating material as a sealing agent around the outer periphery of the lenses between the lenses and a metal shell which supports them, and the use of chemically resistant materials on the inner facing of the glass lens for protection of the glass against chemical attack by the contents of the vessel.

SUMMARY OF THE INVENTION

The present invention provides a unitary, self-contained glass lens assembly which can be mounted in place on a pressure vessel. The lens assembly includes a rigid metal frame member which extends peripherally around the assembly and has an inwardly projecting lip at the outer side to support the glass against pressure forces. A pair of glass lenses are mounted in a stacked relationship within the frame with the outer lens bearing against a gasket at the inwardly projecting lip. A sheet or web of suitable plastic material extends between the two lenses, inwardly along the outer periphery of the inner lens, and then radially outward along the inner side of the frame. This sheet is bonded to both lenses, and the radial space between the lenses and the frame is filled with a suitable plastic potting compound. Finally, another sheet of plastic material extends over the inner face of the inner lens to which it is bonded. This sheet also extends radially outward overlying the other sheet to which it is also bonded. In some applications, the thickness of the two plastic sheets may serve as a gasket between the frame and the body of the pressure vessel, but optionally a separate sealing gasket may be used at this location.

Because the two glass lenses are bonded and laminated together, it is possible that even both of the lenses can be broken without allowing any leakage from the assembly. The plastic sheet material has a relatively high strength and can easily resist pressure forces on it from a leak through a cracked glass lens, and the potting plastic seals the space between the lenses and the frame, as well as molding any broken pieces of glass in place.

When the gage glass is used in a sight glass, it can be arranged for mounting in a standard pipe flange. The rigid metal frame takes the form of a ferrule member, which may be formed by spinning from a piece of thin-walled tubing having an original outer diameter allowing a slight clearance within the bore in the standard pipe flange. The ferrule has an annular inturned lip or flange at the outer end and an outwardly extending flange at the inner end which is clamped between the two pipe flanges. Thus, when it is necessary to replace the lens assembly, it is only necessary to remove the bolts holding the outer flange, substitute a new lens assembly and gasket, and again rebolt the flange in place.

BRIEF DESCRIPTION OF THE DRAWINGS

FIG. 1 is an elevational view of a sight glass incorporating a preferred embodiment of the present invention;

FIG. 2 is a cross sectional view, taken on line 2—2 of FIG. 1;

FIG. 3 is an enlarged, cross sectional view showing details of the ferrule and the mounting of the glass lens discs;

FIG. 4 is an elevational view of a liquid level gage incorporating another preferred embodiment of the present invention;

FIG. 5 is a cross-sectional view, taken on line 5—5 of FIG. 4;

FIG. 6 is a perspective view of the sheet plastic cup incorporated in the embodiment of FIGS. 4 and 5; and FIG. 7 is a cross-sectional view, similar to FIG. 5, showing an alternative embodiment of a liquid level gage incorporating the present invention.

DESCRIPTION OF THE PREFERRED EMBODIMENT

As shown in FIGS. 1 and 2, the lens assembly 10 is mounted against the raised face 12 of the inner flange 11 in line with the bore 13. It will be understood that the flange 11 is secured to the vessel on which the sight glass assembly is to be used in any convenient manner, and that the bore 13 communicates with the interior of the vessel so that any liquid or gas in the vessel is free to contact the lens assembly 10, depending upon the conditions on the interior of the vessel.

Outwardly of the raised face 12, flange 11 has a plurality of tapped bolt holes 14 to secure in place the outer flange 16 by suitable means, such as bolts or cap screws 17, which pass through holes 18 in the outer flange and engage the tapped holes 14. Of course, other methods, such as studs or exterior clamp bolts, could also be used, but under the present circumstances it should be appreciated that the inner flange 11 has the basic dimensions of a standard, raised face pipe flange and the outer flange 16 has the basic dimensions of a standard lap joint pipe flange made to the standard dimensions specified for these flanges. Accordingly, the outer flange 16 is provided with a planar inner face 19 and an axial bore 20 which are joined at a radiused relief, as shown at 21, in accordance with the standard dimensions for a lap joint pipe flange. Furthermore, the flange 16 is provided with a raised central boss 22 extending around bore 20 and terminating in a planar outer face 23.

The lens assembly 10 is shown in greater detail in FIGS. 2 and 3, and includes a metal ferrule member 26 within which the other parts are mounted, as will be described in greater detail hereinafter. The ferrule 26 is preferably formed from a piece of steel tubing by a spinning operation, but, of course, it may also be machined from a solid bar or fabricated by welding. The ferrule 26 includes a cylindrical wall 28 extending the full distance from the ferrule and having outer and inner peripheral sides 29 and 31. At its outer end, the ferrule 26 has an inturned or inwardly projecting flange 33 which extends radially inward to terminate in an inner edge 34 defining reduced diameter visual opening in the lens assembly. While the opening 34 in the ferrule 26 has been shown as being circular in cross section, it is understood that the lens assembly 10 may also be oval, elliptical, or rectangular in shape, and the circular form shown and described herein is selected because it is the most widely used arrangement.

At the inner or lower end, the ferrule 26 has an outwardly extending flange 38 having a planar upper side 39 which contacts the inner face 19 of outer flange 16 when the lens assembly is clamped in place on the inner flange 11.

Mounted within the ferrule 26 are outer and inner glass lenses 43 and 44, respectively. These glass lenses have parallel surfaces and cylindrical outer peripheral surfaces having a diameter slightly less than the inside diameter of the cylindrical wall 28 of the ferrule. Of course, if the ferrule is noncircular, the lenses have a shape substantially in conformance with the shape of the ferrule. While it is normally contemplated that both of the lenses can be made of the same material, such as a tempered soda-lime glass, it is understood that they may be made of special glasses such as borosilicate glass or fused quartz.

In order to prevent direct glass-metal contact, an annular gasket 46 of asbestos or similar material is positioned between the outer surface of the outer glass lens 43 and the inner face 35 of the inturned flange 33, and this gasket 46 not only provides a cushioning action but a sealing action which is of value during assembly, as will be described in greater detail hereinafter. A cup 48 of a plastic-resin material is positioned between the inner and outer glass lenses to have a flat portion 49 between the lenses and a cylindrical sidewall portion 51 extending around the outer periphery of the inner glass lens 44. The cup 48 then also includes a horizontally extending flange portion 52 which extends outwardly from the sidewall portion 51 along the lower side 41 of the ferrule flange 38. Thus, the inner glass lens 44 is positioned entirely within the cup 48, which therefore forms a barrier between the inner and outer lenses to prevent leakage in the event that either or both of the glass lenses should be cracked or broken. The cup 48 is formed from a sheet of transparent plastic material, such as a fluorocarbon polymer, and can be formed by vacuum forming to the indicated shape using a mold sized according to the exact dimensions of the inner glass lens 44.

All of the parts of the complete lens assembly are bonded together by means of a suitable adhesive resin, such as an epoxy novalac resin, which is used not only in thin layers to cause parts to adhere to each other but also to fill all of the interior spaces within the assembly. Accordingly, there is a thin resin layer 54 between the outer side of the flat portion 49 of the plastic cup 48 and the inner side of outer glass lens 43 to bond these two members together, and a resin layer 56 also fills the peripheral space between the outer glass lens 43 and the sidewall 51 of cup 48 and the inner surface 31 of the cylindrical ferrule wall 28. This resin layer also extends in a portion indicated at 57 between the cup flange 42 and the inner surface 41 of the ferrule flange 38.

In similar manner, there is a thin resin layer 59 between the inner side of the flat portion 49 of cup 48 and the outer surface of the inner glass lens 44. The same resin layer extends at 61 between the outer periphery of lens 44 and the cup sidewall 51.

In the preferred embodiment of the invention, the inner surface of the inner glass lens 44 is protected by another plastic sheet or disc 63 that extends across the entire inner surface of the lens assembly, including an outer peripheral portion 66, which extends outwardly for the full diameter of the ferrule flange 38. This disc 63 is bonded to both the lens 44 and the cup flange 52 by a similar thin resin layer 64.

When the lens assembly 10 is mounted between the flanges 11 and 16, it is possible that the plastic materials of the cup flange 52 and the disc outer portion 66 may be sufficiently compressible that no gasket is required. However, as shown in FIG. 2, it is generally preferred to use a soft compressible gasket at 68 which extends over the raised face 12 on flange 11. It should be noted that the central portion of the assembly where the discs are has a slightly lesser thickness than the peripheral portion at the flange 38, so that when the outer flange 16 is clamped in place, compression exists only between the ferrule flange 38 and the inner flange raised face 12, and no compression pressure is therefore exerted directly on the glass lenses 43 and 44. Furthermore, it should be noted that the diameter of the glass lens discs 43 and 44, and hence of the entire lens assembly 10, is selected to be slightly greater than that of the bore 13 in the inner flange 11, and the unit is preferably sized so that the bore in the inner flange is substantially equal to the opening 34 on the inturned flange 33 on the ferrule.

The assembly of the component parts of lens assembly 10 is done by first thoroughly cleaning all of the surfaces to which the epoxy resin is to be bonded and then treating the surfaces with any bonding agents or adhesion-enhancing agents that may be necessary. After this is done, the metal ferrule and the glass lenses are preheated in an oven to a working temperature such as 90° C. to enhance the subsequent curing of the epoxy material and avoiding sudden temperature changes that may cause the glass lenses to fracture. The epoxy resin is then mixed and heated to a high enough temperature to lower its viscosity so that it is able to flow readily and form thin layers. After the epoxy resin has been mixed, the ferrule is placed in an inverted position, with the outer inturned flange resting on a horizontal surface. The gasket 46 is then set in place, followed by the outer lens 43. The epoxy resin is then poured into the ferrule to cover the inner face of outer lens 43, as well as to fill the annular peripheral gap between the lens 43 and the ferrule filled with the resin layer 56. At the same time, the entire rest of the interior of the ferrule is covered by the resin, including the inner face 41 of flange 38. Also at the same time, the resin is poured into the interior of the cup 48 to coat its inner surface and the inner glass lens 44 is placed into the cup and sufficient pressure applied to eliminate any air bubbles that would form in the layers 59 and 61.

After the above has been done, the cup 48, including the inner lens 44, is placed into the ferrule, again forcing out air bubbles to ensure clarity in the resin layer 54, which should be as thin as practically possible. Of course, any excess resin material is thus forced outward into the space between the cup flange 52 and the ferrule flange 38, and may be removed as necessary.

At this point, it will be seen that the gasket 46 serves as a seal to prevent leakage of the liquid resin during assembly, as well as its cushioning effect when the lens assembly is in use. It should be noted, however, that in many cases it is desirable to use a slightly porous material, such as asbestos, for the gasket 46, in which case a small amount of the epoxy may flow through the gasket and form a bead at the exterior junction between the gasket 46 and the outer surface of lens 43, but this is in no way undesirable.

After the inner lens 44 and cup 48 have been assembled together and all air bubbles removed, an additional amount of the epoxy resin is poured over the inner face of the inner glass lens 44 and the exposed flange 52 of the cup 48. The disc 63 is then pressed in place and, again, care is taken to apply suitable pressure to exclude all air bubbles from the resin layer 64.

The next step is to place the inverted assembly into a clamping fixture which applies separate pressures to the lens area and outer flange area. By first applying pressure to the lens and then to the flange, any distortion of the disc 63 is eliminated and there is no chance for air bubbles to enter the liquid resin. After the necessary clamping has taken place, it is then necessary only to place the assembly into a curing oven to complete the curing of the epoxy resin.

It is understood that different materials may be used for the lenses 43 and 44, and various suitable plastic or resinlike materials can be used for the cup 48 and disc 63. However, when the assembly is bonded together in the manner described and clamped between the flanges, no compression pressure is placed on the glass lenses 43 and 44. Nevertheless, if either or even both of the lenses should be broken, the assembly will not leak as long as the cup member 46 is unbroken, since it forms as a unitary member a complete seal across the assembly, which is sealed at the ferrule flange 38. With this arrangement, the glass lenses 43 and 44 serve no sealing function, but merely provide strength against the pressure in the vessel to which the sight glass is attached and permit the visual inspection of the interior.

It is also understood that in certain applications the disc 63, and hence the resin layer 64, may be eliminated so that the inner surface of inner lens 44 is exposed to the interior of the pressure vessel, and it is also understood that the gasket 68 may be eliminated, since the flange portion 52 of cup 48 does have a certain amount of resilience to function as a gasket or seal under certain conditions.

It is also understood that the disc 63 may be made of various transparent materials that are selected solely for their resistance to chemical and physical attack by the contents of the pressure vessel, since, although the disc 63 can perform a sealing function if the glass lenses are broken, this entirely a secondary function since the cup 48 provides the primary sealing function under such conditions.

Another embodiment of the invention is shown in FIGS. 4 and 5 as applied to a liquid level gage of the type used for visual observation of the level of a liquid within a storage or process tank. The liquid level gage 100 has an upper pipe 101 and lower pipe 103, both of which are connected to and in free fluid communication with the tank so that the level within the gage 100 is the same as the level within the tank as determined by the forces of gravity. Gage 100 includes a body member 105 comprising, as shown in FIG. 5, a pair of sidewalls 107 and 108 which define between them an internal chamber 110. The other sides of chamber 110 are enclosed by a pair of covers 111 and 112 which may be indentical in structure and function, so that only the one cover 111 will be described in greater detail hereinafter, it being understood that all of the details of cover 111 are equally applicable to the other cover 112.

The covers 111 and 112 are clamped on the sides of body 105 by a plurality of bolts 114 and nuts 115, and it will be noted that in high pressure applications the bolts 114 may be in abutting contact with the sidewalls 107 and 108 to restrain against lateral outward movement of the sidewalls as a result of the pressure within chamber 110.

Cover 111 has therein an elongated opening 118 which may extend for substantially the full vertical extent of the chamber 110. On the inner side, cover 111 has a similar elongated recess 120 which is larger in both length and width than the opening 118 to define an outer face 121 adjacent opening 118. The other side of recess 120 opens onto the inner face 123 of cover 111, and is clamped against the body 105, as described in greater detail hereinafter.

Within the recess 120 is located an outer lens 125 only slightly smaller in its outer peripheral dimensions than the recess 120, and the outer lens 125 is in engagement with a gasket 126 extending between the lens 125 and the outer face 121 to prevent metal-to-glass contact. Inwardly of the outer lens 125 is a cup 128, which is shown in greater detail in FIG. 6. The cup 128 is formed of a sheet plastic material, preferably a fluorocarbon polymer, and is substantially identical in structure and function with the cup 48 in the embodiment of FIGS. 1-3. It should be noted that because the cup 128 is formed a sheet of plastic, using suitable means such as a vacuum forming process, the sheet of plastic tends to have a relatively high degree of tensile strength, which is typical of plastic sheeting as compared to similar plastic molding compounds. The cup 128 has a flat center section 129 adjacent the outer lens 125 and a peripheral wall 131 extending inwardly toward the cover inner face 123, where it joins a radially extending flange 132 adapted to overlie the inner face 123 of cover 111. The inner lens 135 is located within the cup 128, and both of the lenses and the cup are bonded into the cover 111 by means of a resin layer 137 which serves to bond not only the two lenses to the cup but also the cup to the recess 120 and the outer lens 125 to both the recess 120 and the outer face 121 and gasket 126. Although not shown in detail, it is understood that the assembly of the two lenses and cups into the cover 111 is done using the same methods as used in the embodiment of FIGS. 1-3.

While the cup flange 132 can serve as a gasket between the inner face 123 of cover 111 and the side face 141 of body 105, as an option, a protective sheet 139 can extend over the inner surface of inner lens 135 and be bonded not only to the inner lens but to the flange 132 in the same manner as the sheet 63 in the embodiment of FIGS. 1-3. Where the protective sheet 139 is used, it, as well as the cup flange 132, serves as a sealing gasket to prevent leakage of liquid from the body chamber 110. However, in either case, the total thickness of the two lenses 125 and 135, the gasket 126, and the center panel 139 of cup 128 should be less than the depth of recess 120 so that when the cover 111 is bolted in place, no pressure is applied to the lenses as a result of any contact with the body 105.

It will thus be seen that in the liquid level gage of FIGS. 4 and 5, the arrangement of the cup and the lenses is substantially the same as in the sight glass arrangement shown in FIGS. 1-3, with the exception that the cover 111 serves the same function as the ferrule 126 in providing a rigid metal frame to hold the other members in place, and when replacement is required, the entire cover 111 is removed from the gage and replaced with a new cover containing the lenses 125 and 135, as well as cup 128, as a unitary assembly. On the other hand, it is recognized that rather than using an entire cover 111 as a support frame, it would also be possible to use a similar shaped thin metal ferrule as a separate unit and the ferrule containing the lenses and the plastic cup would then be clamped in place between the cover and the body.

While the embodiment of FIGS. 4 and 5 has covers and lens assemblies on opposite sides of the chamber 110, and this requires observation of the liquid level by transmitted light through both of the lens assemblies, the invention can also be applied to a reflex type sight glass which relies on reflected light for observing the liquid level. FIG. 7 thus shows a reflex type liquid level gage having a body 150 defining therein a chamber 152 and having an exposed side face 153 defining an open side for the chamber 152. The side face 153 is covered by a cover member 155, which may be identical in construction with the cover 111 except that in the case of a reflex sight glass, no protective sheet 139 is used, since the inner surface of the inner lens must be exposed to the liquid within chamber 152. The cover 155 is secured to body 150 by suitable means, such as U-bolts 157 and nuts 158. The cover 155 thus has an outer lens 160, cup 161, and inner lens 162 assembled therein in the same manner as in the case of the embodiments of FIGS. 4 and 5. In this case, the outer flange of cup 161 serves as the sole gasket between the cover 155 and body 150, and in the well known manner of reflex sight glasses, the inner lens 162 has a prism surface 164 on its inner side in direct contact with the liquid within chamber 152. When the lens assembly is observed through reflected light passing from the outside into the chamber 152 and back out through the lens assembly, the wetting of the prism surface 164 changes the reflectivity of the prism surface, giving a generally darkened appearance as compared to that portion of the prism surface 164 in contact with the vapor above the liquid level in the manner well known in the art of reflex liquid level gages.

While several preferred embodiments of the present invention have been disclosed and described in particular detail, it is to be understood that various other modifications and rearrangements may be made without departing from the scope of the invention as defined in the following claims.

What is claimed is:

1. A lens assembly for a sight glass comprising a ferrule, said ferrule having an axially extending sidewall with an outwardly extending flange at one end and an inwardly extending flange at the other end, a first lens in said ferrule having a first side adjacent said inwardly extending flange, a second lens in said ferrule having a first side adjacent said outwardly extending flange, the opposite sides of said lenses being adjacent each other, and a sheet of transparent flexible plastic material extending between said lenses, between the outer periphery of said second lens and said ferrule sidewall and extending along the outer side of said outwardly extending flange.

2. A lens assembly as set forth in claim 1, wherein said sheet is bonded to said opposite sides of said lenses.

3. A lens assembly as set forth in claim 2, wherein said sheet is also bonded to said ferrule wall and said outer side of said outwardly extending flange.

4. A lens assembly as set forth in claim 3, including a second sheet of transparent flexible plastic material bonded to said first side of said second lens and to the portion of said first sheet extending along said outwardly extending flange.

5. A lens assembly as set forth in claim 3, including a gasket between said first side of said first lens and said inwardly extending flange, and bonding material filling the space between the outer periphery of said first lens and said ferrule sidewall.

6. A sight glass comprising a first pipe flange adapted to be attached to a pressure vessel, a second pipe flange secured to said first flange and defining an opening, a lens assembly clamped between said flanges and extending through said opening, said lens assembly comprising a ferrule, said ferrule having an axially extending sidewall within said opening, said ferrule also having an integral outwardly extending flange at the inner end clamped between said pipe flanges and an integral inwardly extending flange at the other end, a first lens in said ferrule having a first side adjacent said inwardly extending flange, a second lens in said ferrule having a first side adjacent said outwardly extending flange, the opposite sides of said lenses being adjacent each other, and a sheet of transparent flexible plastic material extending between said lenses, between the outer periphery of said second lens and said ferrule sidewall and along said outwardly extending flange adjacent said first pipe flange.

7. A sight glass as set forth in claim 6, wherein said flexible plastic sheet is bonded to said opposite sides of said lenses.

8. A sight glass as set forth in claim 7, wherein said flexible plastic sheet is also bonded to said ferrule wall and the outer periphery of said second lens and to said outwardly extending flange.

9. A sight glass as set forth in claim 8, including a second sheet of transparent flexible plastic material bonded to said first side of said second lens and extending completely across said first side of said second lens and across said portion of said first sheet adjacent said outwardly extending flange.

10. A sight glass as set forth in claim 8, including a gasket between said first side of said first lens and said inwardly extending flange and bonding material filling the space between the outer periphery of said first lens and said ferrule sidewall.

11. A sight glass as set forth in claim 9, including a second gasket positioned between said second sheet and said first pipe flange.

12. A lens assembly comprising a frame, said frame having an axially extending sidewall with an outwardly extending surface at one end and an inwardly extending surface at the other end, a first lens in said frame having a first side adjacent said inwardly extending surface, a second lens in said frame having a first side adjacent said outwardly extending surface, the opposite sides of said lenses being adjacent each other, and a sheet of transparent flexible plastic material extending between said lenses, between the outer periphery of said second lens and said frame sidewall and extending along the outer side of said outwardly extending surface.

13. A lens assembly as set forth in claim 12, wherein said sheet is bonded to said opposite sides of said lenses.

14. A lens assembly as set forth in claim 13, wherein said sheet is also bonded to said frame sidewall and said outer side of said outwardly extending surface.

15. A lens assembly as set forth in claim 14, wherein said first side of said second lens has a reflex prism surface.

16. A lens assembly as set forth in claim 14, including a second sheet of transparent flexible plastic material bonded to said first side of said second lens and to the portion of said first sheet extending along said outwardly extending surface.

17. A lens assembly as set forth in claim 14, including a gasket between said first side of said first lens and said inwardly extending surface, and bonding material filling the space between the outer periphery of said first lens and said frame sidewall.

18. A liquid level gage comprising an elongated body defining an elongated chamber therein, an inlet and an outlet for said chamber, said body having at least one elongated face defining an opening of said chamber, and a cover secured to said body to overlie said face, said cover having an elongated recess on the inner side adjacent said face in substantial alignment with said chamber opening, said recess having a sidewall extending outwardly from said inner side, said sidewall terminating at its outer edge in an inwardly extending surface defining a cover opening extending through said cover to give visual access to said chamber, a first lens in said recess having a first side adjacent said inwardly extending surface, a second lens in said recess having a first side adjacent said chamber, the opposite sides of said lenses being adjacent each other, and a sheet of transparent flexible plastic material extending between said opposite sides of said lenses, between the outer periphery of said second lens and said recess side wall and extending along the inner side of said cover in abutting relationship with said cover and the elongated face on said body to provide a seal between said body and said cover and to provide an imperforate seal against fluid flow from said chamber through said cover opening.

19. A liquid level gage as set forth in claim 18, wherein said sheet is bonded to said opposite sides of said lenses and to said cover.

20. A liquid level gage as set forth in claim 19, including a gasket between said first side of said first lens and said inwardly extending surface, and bonding material filling the space between the outer periphery of said first lens and said recess sidewall.

21. A liquid level gage as set forth in claim 18, wherein said first side of said second lens has a reflex prism surface.

* * * * *